US008739950B2

(12) United States Patent
Lundberg et al.
(10) Patent No.: US 8,739,950 B2
(45) Date of Patent: Jun. 3, 2014

(54) AUXILIARY PUMP SYSTEM FOR HYBRID POWERTRAINS

(75) Inventors: Philip C. Lundberg, Keego Harbor, MI (US); John C. Schultz, Saline, MI (US); Vijay A. Neelakantan, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1141 days.

(21) Appl. No.: 12/549,535

(22) Filed: Aug. 28, 2009

(65) Prior Publication Data

US 2010/0071357 A1 Mar. 25, 2010

Related U.S. Application Data

(60) Provisional application No. 61/100,054, filed on Sep. 25, 2008.

(51) Int. Cl.
*F16D 25/00* (2006.01)

(52) U.S. Cl.
USPC ........................................ 192/48.601; 60/419

(58) Field of Classification Search
USPC ............................. 60/419; 192/48.601, 85.63
See application file for complete search history.

(56) References Cited

U.S. PATENT DOCUMENTS

| | | | | |
|---|---|---|---|---|
| 4,026,107 | A * | 5/1977 | Kosek et al. | 60/419 |
| 5,878,569 | A * | 3/1999 | Satzler | 60/419 |
| 6,151,894 | A * | 11/2000 | Endo et al. | 60/414 |
| 6,370,873 | B1 * | 4/2002 | Schaich et al. | 60/419 |
| 6,854,268 | B2 * | 2/2005 | Fales et al. | 60/414 |
| 7,444,809 | B2 * | 11/2008 | Smith et al. | 60/413 |
| 2008/0190729 | A1 * | 8/2008 | Stehr et al. | 192/85 R |

* cited by examiner

*Primary Examiner* — F. Daniel Lopez

(57) ABSTRACT

An auxiliary pump system for a hybrid powertrain includes a hydraulic accumulator, a hydraulic transformer, a plurality of control devices, a sump, and a plurality of fluid flow paths. The accumulator is charged by a high flow, high pressure hydraulic fluid by opening a first of the control devices and closing a second of the control devices. The accumulator is discharged by closing the first of the control devices and opening the second of the control devices. A high pressure, low flow hydraulic fluid is communicated from the accumulator to the hydraulic transformer. The hydraulic transformer converts the high pressure, low flow hydraulic fluid into a high flow, low pressure hydraulic fluid that is employed by systems within the hybrid powertrain.

16 Claims, 3 Drawing Sheets

AUXILIARY PUMP SYSTEM FOR HYBRID POWERTRAINS

CROSS-REFERENCE TO RELATED APPLICATIONS

This application claims the benefit of U.S. Provisional Application No. 61/100,054, filed on Sep. 25, 2008, which is hereby incorporated in its entirety herein by reference.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a pump that provides a pressurized fluid, such as oil, to a plurality of valves and solenoids within a valve body. The pump is typically driven by the engine during operation of the powertrain.

However, in the case of hybrid powertrains using a combination of the internal combustion (IC) engine and electric propulsion motor or belt alternator starter (BAS) powertrains, the engine has periods of shutdown in order to conserve fuel. As a result, during this time of passive engine operation the main transmission pump stops pressurizing the hydraulic fluid in the transmission or hybrid transmission. However, the components within the transmission must still receive a flow of pressurized hydraulic fluid in order to maintain operability. Current hybrid systems use a motor driven auxiliary pump to deliver a pressurized hydraulic fluid flow to these components, such as the range clutches, in order to keep these components engaged so that the transmission is ready to respond. However, these conventional auxiliary pump systems that are driven by an electric motor may suffer from low system efficiency, may be large in size and can be expensive.

Accordingly, there is a need in the art for an auxiliary pump system for use in hybrid powertrains that increases efficiency, thereby leading to better fuel economy and allowing for longer engine passive time periods. Moreover, the auxiliary pump system should reduce the packaging size of the system and reduce the power costs of operating the system.

SUMMARY

The present invention provides an auxiliary pump system for a hybrid powertrain. The auxiliary pump system includes a hydraulic accumulator, a hydraulic transformer, at least one control device, a sump, and a plurality of fluid flow paths. The fluid flow paths interconnect the various components of the auxiliary pump system.

In one aspect of the present invention, the accumulator is charged by a high flow, high pressure hydraulic fluid by opening a first control device and closing a second control device. The accumulator is discharged by closing the first control device and opening the second control device. A high pressure, low flow hydraulic fluid is communicated from the hydraulic accumulator to the hydraulic transformer. The hydraulic transformer converts the high pressure, low flow hydraulic fluid into a high flow, low pressure hydraulic fluid that is employed by systems within the hybrid powertrain.

In another aspect of the present invention, the first control device is a ball check valve, on/off solenoid, or variable force solenoid and the second control device is an on/off solenoid, or variable force solenoid.

In yet another aspect of the present invention, the plurality of control devices are on/off solenoids or variable force solenoids.

In yet another aspect of the present invention, the accumulator is replaced with a piezoelectric pump, and the piezoelectric pump pumps a high pressure, low flow of hydraulic fluid from the sump directly to the hydraulic transformer.

In yet another aspect of the present invention, the components within the auxiliary pump system are modular and may be packaged separately from one another.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
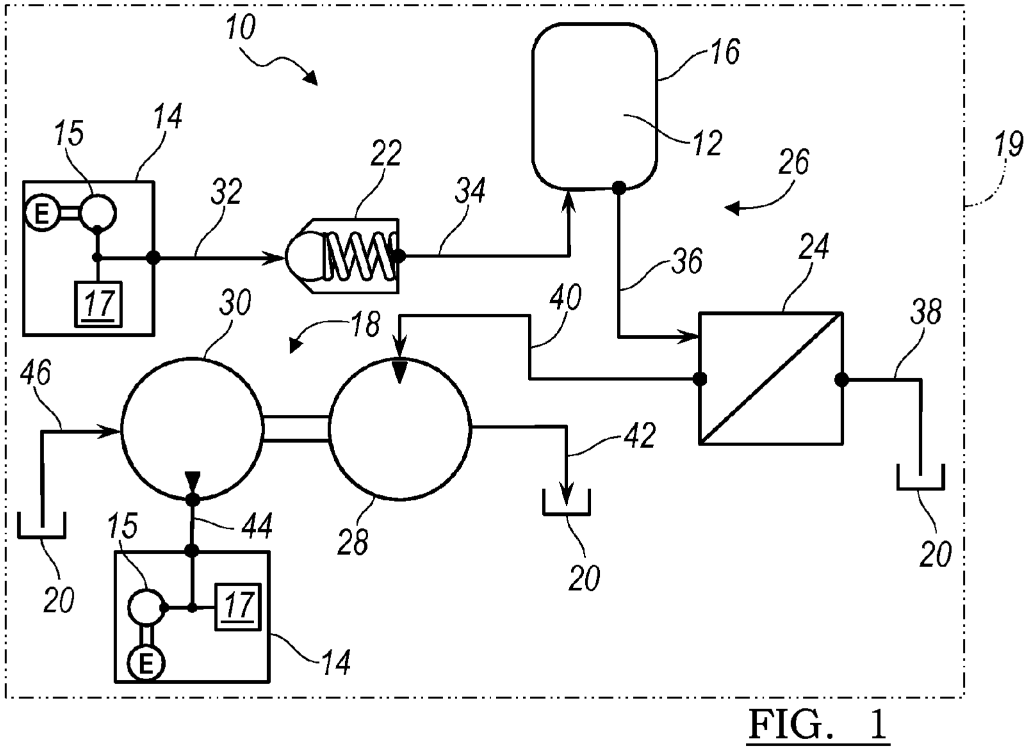
FIG. 1 is a schematic diagram of an embodiment of an auxiliary pump system according to the principles of the present invention.

With reference to FIG. 1, an auxiliary pump system according to the principles of the present invention is generally indicated by reference number 10 wherein the arrows indicate the direction of preferred fluid flow. The hydraulic control system 10 is preferably employed in a hybrid powertrain in a motor vehicle, however, it should be appreciated that the auxiliary pump system 10 may be employed in any type of powertrain without departing from the scope of the present invention. The auxiliary pump system 10 is operable to provide and receive a flow of pressurized hydraulic fluid 12 to and from a hydraulic control system 14. The hydraulic fluid 12 may take various forms without departing from the scope of the present invention. The hydraulic control system 14 includes a source of hydraulic fluid, such as engine driven pump 15, as well as various valves, solenoids, and range clutches 17 used to control a transmission 19. The pressurized flow of hydraulic fluid 12 within the hydraulic control system 14 may be used in a number of ways, including, but not limited to, engaging the range clutches 17, providing hydraulic control functions, lubrication, or cooling to rotatable shafts, gearing arrangements, and/or other torque transmitting devices.

The auxiliary pump system 10 generally includes a hydraulic accumulator 16, a hydraulic transformer 18, a sump 20, a first control device 22, and a second control device 24 all interconnected via a hydraulic circuit 26. The hydraulic accumulator 16 is an energy storage device in which the non-compressible hydraulic fluid 12 is held under pressure by an external source. In the example provided, the hydraulic accumulator is a spring type or gas filled type accumulator having a spring or compressible gas that provides a compressive force on the hydraulic fluid 12 within the hydraulic accumulator 16. However, it should be appreciated that the hydraulic accumulator 16 may be of other types, such as a gas-charged type, without departing from the scope of the present invention.

The hydraulic transformer 18 is a device employed to convert a first flow of hydraulic fluid having a first flow rate and a first pressure to a second flow of hydraulic fluid having a second flow rate and a second pressure. The hydraulic transformer 18 generally includes a hydrostatic or hydraulic motor 28 coupled to a hydraulic pump 30. The hydraulic transformer 18 may be of various types, such as radial or axial types, without departing from the scope of the present invention.

The sump 20 is a tank, container, or other reservoir for storing the hydraulic fluid 12. The sump 20 preferably includes a sump filter (not shown) operable to remove particulates from the hydraulic fluid 12 entering or exiting the sump 20. It should be appreciated that the sump filter is only needed for the pump, which provides oil to the hydraulic controls system in the transmission.

The first control device 22 is operable to control a flow of the hydraulic fluid 12 between the hydraulic control system 14 and the hydraulic accumulator 16, as will be described in greater detail below. The first control device 22 is preferably a check valve that allows fluid flow in one direction only, but could also include an on/off solenoid.

The second control device 24 is operable to control a flow of the hydraulic fluid 12 between the hydraulic accumulator 16 and the hydraulic transformer 18, as will also be described in greater detail below. The second control device 24, in the example provided, is an electrically activated solenoid, preferably an on/off solenoid, but may alternatively be a variable force solenoid.

The hydraulic circuit 26 includes a plurality of fluid flow paths, passages, or channels that are either milled or formed in a housing of the transmission 19, in a valve body, or in various powertrain components such as shafts. In addition the fluid flow paths of the hydraulic circuit 26 may be defined by pipes, tubing, or between sealed components. The fluid flow paths may be of any size or shape and have any number of branching portions without departing from the scope of the present invention. In the example provided, a first fluid flow path 32 communicates between the hydraulic control system 14 and the first control device 22. A second fluid flow path 34 communicates between the first control device 22 and the hydraulic accumulator 16. A third fluid flow path 36 communicates between the hydraulic accumulator 16 and the second control device 24. A fourth fluid flow path 38 communicates between the second control device 24 and the sump 20. A fifth fluid flow path 40 communicates between the second control device 24 and the hydraulic transformer 18. More specifically, the fifth fluid flow path 40 preferably communicates with the hydraulic motor 28 of the hydraulic transformer 18. A sixth fluid flow path 42 communicates between the hydraulic transformer 18 and the sump 20. A seventh fluid flow path 44 communicates between the hydraulic transformer 18 and the hydraulic control system 14. Finally, an eighth fluid flow path 46 communicates between the hydraulic transformer 18 and the sump 20. More specifically, the eighth fluid flow path 46 preferably communicates with the hydraulic pump 30 of the hydraulic transformer 18.

The auxiliary pump system 10 provides a high flow of low pressure hydraulic fluid such as 5 to 10 Liters/minute and up to 350 kPa to the hydraulic control system 14 upon demand. First, the hydraulic accumulator 16 is charged when the second control device 24 is closed and a high pressure and high flow rate of hydraulic fluid 12 leaves the hydraulic control system 14 through the first fluid flow path 32. The second control device 24 exhausts hydraulic fluid 12 to the sump 20 via the third fluid flow path 38 when the second control device 24 is closed. When the pressure of the hydraulic fluid 12 within the first fluid flow path 32 is high enough, the first control device 22 is urged to an open position (i.e., the check ball is unseated) and the hydraulic fluid 12 travels through the second fluid flow path 34 and charges the hydraulic accumulator 16. When the pressure of the hydraulic fluid 12 within the first fluid flow path 32 drops, the first control device 22 automatically closes as the check ball seats and the hydraulic accumulator 16 becomes hydraulically sealed off from the rest of the components within the auxiliary pump system 10. Once charged, the hydraulic accumulator 16 retains the high pressure hydraulic fluid 12 until the second control device 22 is opened.

In order to activate the auxiliary pump system 10 in order to provide pressurized hydraulic fluid 12 to the hydraulic control system 14, the second control device 24 is opened. Once the second control device 24 is opened, a high pressure, low flow of the hydraulic fluid 12 as high as 2000 kPa and 1 liters/minute is ejected from the hydraulic accumulator 16 and passes through the third fluid flow path 36, through the second control device 24, through the fifth fluid flow path 40 and into the hydraulic motor 28 of the hydraulic transformer 18. The hydraulic motor 28 transforms the high pressure, low flow of the hydraulic fluid 12 into rotational power. The hydraulic fluid 12 within the hydraulic motor 28 then bleeds off through the sixth fluid flow path 42 and into the sump 20 after the power has been extracted from the hydraulic fluid 12. The rotational power extracted from the hydraulic fluid 12 via the hydraulic motor 28 is then transferred to the hydraulic pump 30. The hydraulic pump 30 draws hydraulic fluid 12 up from the sump 20 via the eighth fluid flow path 46 and creates a low pressure, high flow of the hydraulic fluid 12 that exits the hydraulic pump 30 via the seventh fluid flow path 44. The low pressure, high flow hydraulic fluid 12 is then communicated to the hydraulic control system 14 to operate powertrain components, such as, for example, keeping clutch circuits active when the engine is off during BAS operation in a hybrid powertrain.

Figure 2:
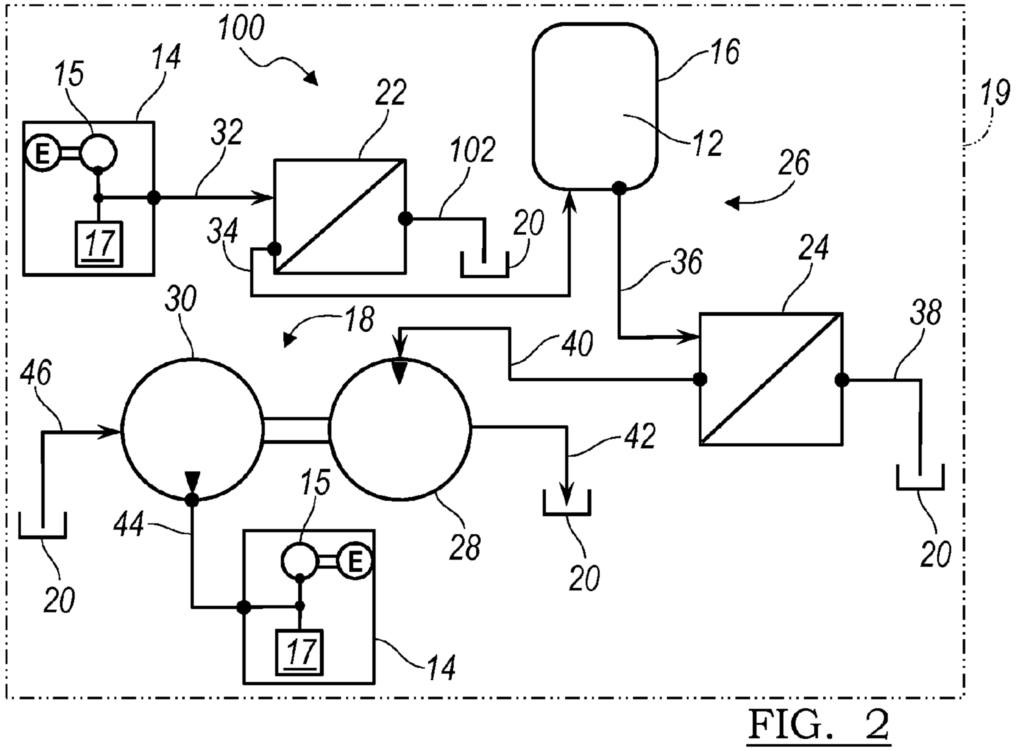
FIG. 2 is a schematic diagram of another embodiment of an auxiliary pump system according to the principles of the present invention.

Turning now to FIG. 2, an alternate embodiment of the auxiliary pump system is indicated by reference number 100 wherein the arrows indicate the direction of preferred fluid flow. The auxiliary pump system 100 is substantially similar to the auxiliary pump system 10 illustrated in FIG. 1, and accordingly like parts are indicated with like reference numbers. However, in the auxiliary pump system 100, the first control device 22 is an on/off solenoid or a variable force solenoid. The on/off solenoid or a variable force solenoid operates within the auxiliary pump system 100 substantially similar to the ball check valve of FIG. 1, however, the on/off solenoid or a variable force solenoid must be opened to allow the hydraulic accumulator 16 to charge and closed to allow the hydraulic accumulator 16 to retain the charge. A ninth fluid flow path 102 communicates between the on/off solenoid or a variable force solenoid and the sump 20 to allow the on/off solenoid to exhaust when closing.

Figure 3A:
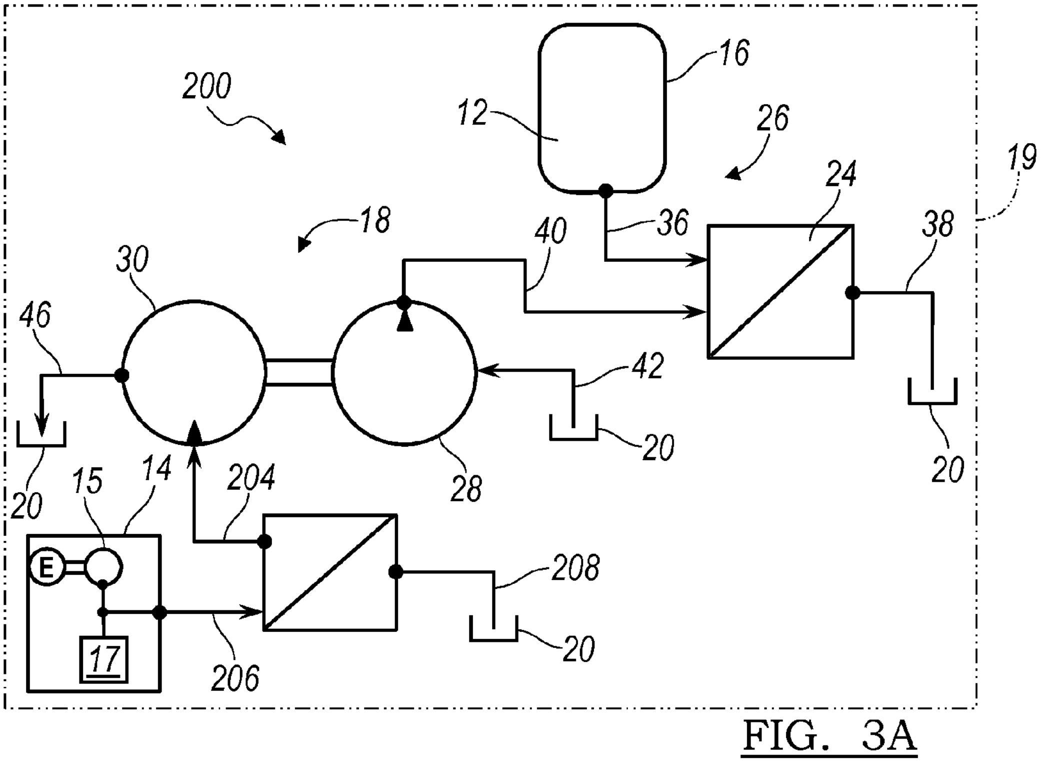
FIG. 3A is a schematic diagram of yet another embodiment of an auxiliary pump system according to the principles of the present invention illustrated in a charge condition.
Figure 3B:
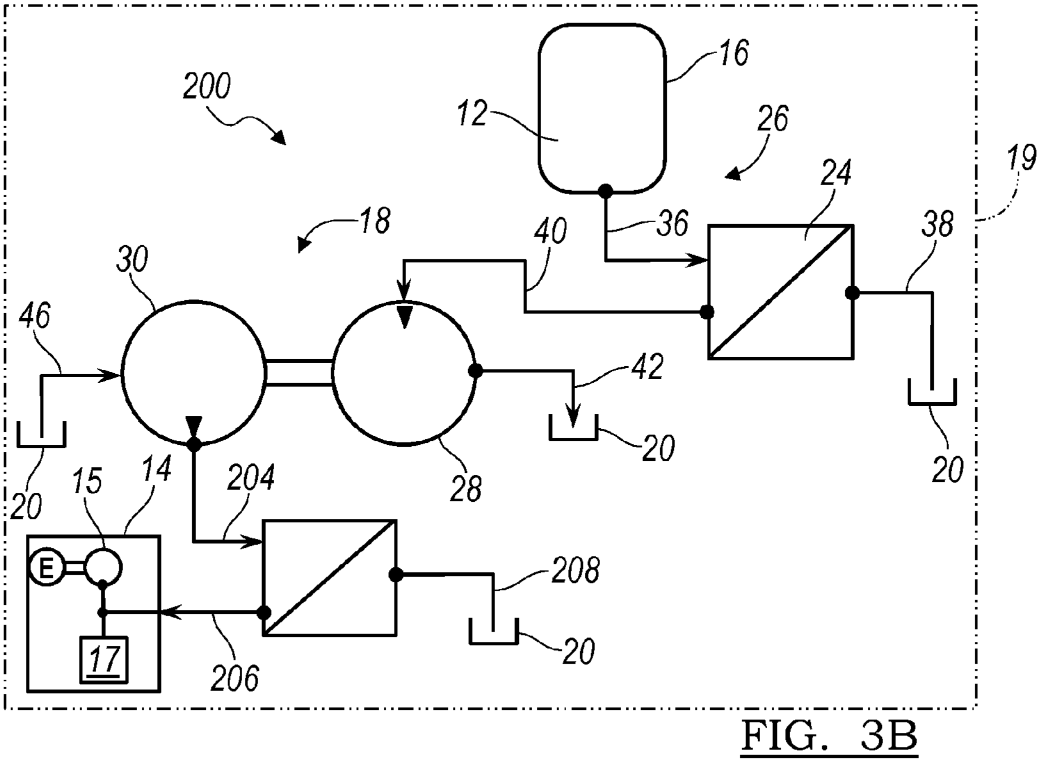
FIG. 3B is a schematic diagram of the auxiliary pump system of FIG. 3A in a discharge condition.

With reference to FIG. 3A and 3B, another alternate embodiment of the auxiliary pump system is indicated by reference number 200 wherein the arrows indicate the direction of preferred fluid flow. The auxiliary pump system 200 is substantially similar to the auxiliary pump system 10 illustrated in FIG. 1, and accordingly like parts are indicated with like reference numbers. However, in the auxiliary pump system 200, the first fluid flow path 32 and the first control device 22 are removed and the seventh fluid flow path 44 is replaced with a third control device 202 and a tenth fluid flow path 204 that communicates between the third control device 202 and the hydraulic pump 30 and an eleventh fluid flow path 206 that communicates between the third control device 202 and the hydraulic control system 14. The third control device 202 is preferably an on/off solenoid or a variable force solenoid. A twelfth fluid flow path 208 communicates between the on/off solenoid or a variable force solenoid 202 and the sump 20 to allow the on/off solenoid or a variable force solenoid 202 to exhaust when closing.

With reference to FIG. 3A, the auxiliary pump system 200 is charged when the second and third control devices 24, 202 are opened and a high flow, low pressure hydraulic fluid 12 exits the hydraulic control system 14 and communicates through the eleventh fluid flow path 206, through the third control device 202, through the 204 and into the hydraulic pump 30 of the hydraulic transformer 18. This reversed flow of hydraulic fluid reverses the roles of the hydraulic pump 30 and the hydraulic motor 28 within the hydraulic transformer 18. Accordingly, the high flow, low pressure hydraulic fluid 12 back drives the hydraulic pump 30 effectively turning the hydraulic pump 30 into a hydraulic motor. The hydraulic pump 30 then transfers the power to the hydraulic motor 28 and the hydraulic motor 28 effectively becomes a hydraulic pump. Accordingly, a high pressure, low flow of hydraulic fluid 12 exits the hydraulic motor 28 and passes through the fifth fluid flow path 40, through the second control device 24, through the third fluid flow path 36 and charges the hydraulic accumulator 16. When the hydraulic accumulator 16 is filled the second control device is closed or turned off to allow the high pressure hydraulic fluid 12 to be stored in the hydraulic accumulator 16.

With reference to FIG. 3B, the auxiliary pump system 200 is activated in a manner substantially similar to the auxiliary pump system 10 in FIG. 1. In order to activate the auxiliary pump system 200, the second control device 24 and the third control device 202 are opened. Once the second control device 24 is opened, a high pressure, low flow of the hydraulic fluid 12 is discharged from the hydraulic accumulator 16 and passes through the third fluid flow path 36, through the second control device 24, through the fifth fluid flow path 40 and into the hydraulic motor 28 of the hydraulic transformer 18. The hydraulic motor 28 transforms the high pressure, low flow of the hydraulic fluid 12 into rotational power. The hydraulic fluid 12 within the hydraulic motor 28 then bleeds off through the sixth fluid flow path 42 and into the sump 20 after the power has been extracted from the hydraulic fluid 12. The rotational power extracted from the hydraulic fluid 12 via the hydraulic motor 28 is then transferred to the hydraulic pump 30. The hydraulic pump 30 draws hydraulic fluid 12 up from the sump 20 via the eighth fluid flow path 46 and creates a low pressure, high flow of the hydraulic fluid 12 that exits the hydraulic pump 30 via the ninth fluid flow path 204. The low pressure, high flow hydraulic fluid 12 communicates through the third control device 202, through the eleventh fluid flow path 206, and finally communicated to the hydraulic control system 14 to operate powertrain components.

Figure 4:
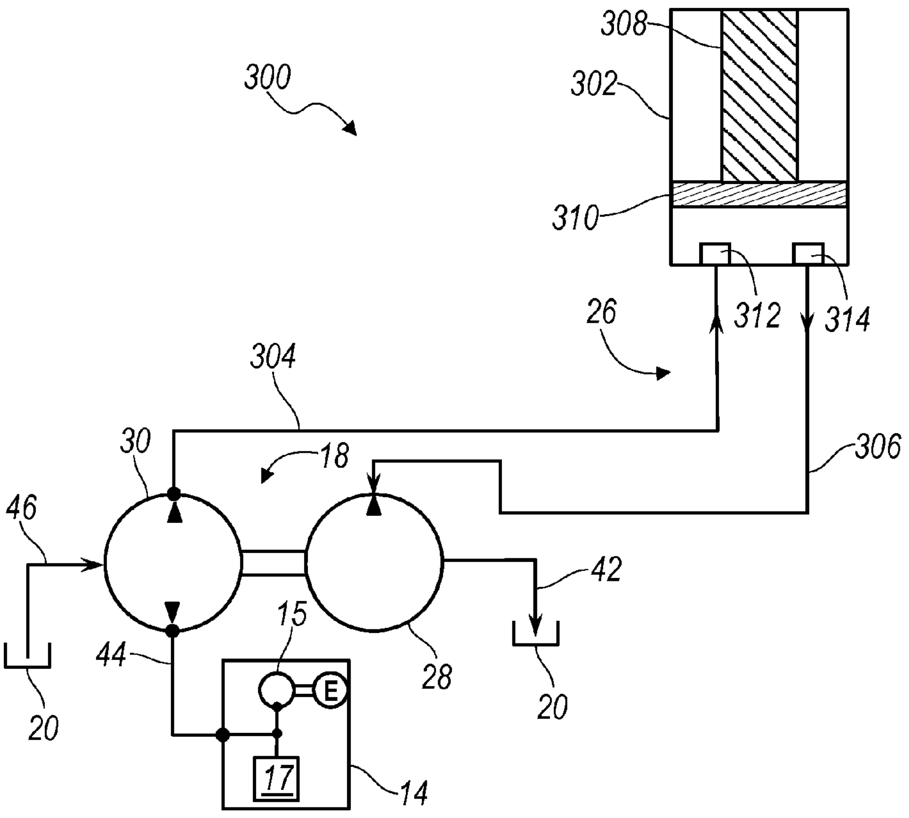
FIG. 4 is a schematic diagram of yet another embodiment of an auxiliary pump system according to the principles of the present invention.

Turning now to FIG. 4, another alternate embodiment of the auxiliary pump system is indicated by reference number 300 wherein the arrows indicate the direction of preferred fluid flow. The auxiliary pump system 300 is substantially similar to the auxiliary pump system 10 illustrated in FIG. 1, and accordingly like parts are indicated with like reference numbers. However, in the auxiliary pump system 300, the first, second, third, fourth, and fifth fluid flow paths 32, 34, 36, 38, 40, the first and second control devices 22, 24, and the hydraulic accumulator 16 are removed. Instead, the auxiliary pump system 300 includes a piezoelectric pump 302. An input fluid flow path 304 communicates between the eighth fluid flow path 46 and the piezoelectric pump 302 and an output fluid flow path 306 communicates between the piezoelectric pump 302 and the hydraulic motor 28 of the hydraulic transformer 18.

The piezoelectric pump 18 in the example provided generally includes an actuator stack 308, a diaphragm 310, an inlet valve 312, and an outlet valve 314. It should be appreciated, however, that the piezoelectric pump 302 may have various other configurations without departing from the scope of the present invention. The actuator stack 308 is at least in partial contact with the diaphragm 310. The actuator stack 308 is comprised of a plurality of stacked piezoelectric material layers. The piezoelectric material layers are comprised of a piezoelectric material that is operable to expand and contract (i.e., produce a strain output or deformation) when a suitable electric voltage is applied to the actuator stack 308. Examples of piezoelectric materials include, but are not limited to, quartz crystals, lead niobate barium titanate, and other titante compounds such as lead zirconate titante. However, it should be appreciated that the actuator stack 308 may take various forms without departing from the scope of the present invention, for example, the actuator stack 308 may include a single layer of piezoelectric material or other configurations other than or in addition to stacked layers of piezoelectric materials. The diaphragm 310 is preferably fixed relative to the actuator stack 308 and is comprised of a flexible but resilient material. The diaphragm 310 is operable to be deformed or flexed by the movement of the actuator stack 308. Alternatively, the diaphragm 310 may be replaced by a conventional sliding piston or a piston/diaphragm combination without departing from the scope of the present invention. The inlet valve 312 is preferably a one-way valve operable to allow hydraulic fluid 12 to enter the piezoelectric pump 302 only. The outlet valve 314 is preferably a one-way valve operable to allow hydraulic fluid 12 to exit the piezoelectric pump 302 only. The inlet and outlet valves 312, 314 may take various forms including, but not limited to, one-way leaf valves, a check valves, reed valves, or a solenoid activated valves.

The piezoelectric pump 302 is capable of providing a high pressure, low flow of the hydraulic fluid 12 upon activation of the piezoelectric pump 302. More specifically, deformation or flexing of the diaphragm 310 creates a pumping action within the piezoelectric pump 302. Hydraulic fluid 12 is drawn from the sump 20, through the eighth fluid flow path 46, through the inlet fluid flow path 304 and through the inlet valve 312 into the piezoelectric pump 302. A high pressure, low flow of hydraulic fluid 12 is urged out of the outlet valve 314 of the piezoelectric pump 302, through the outlet fluid flow path 306 and into the hydraulic motor 28 of the hydraulic transformer 18. For example, the piezoelectric pump 302 may provide pressures of 3500 kPa and a flow rate up to 1.8 L/min. The hydraulic motor 28 transforms the high pressure, low flow of the hydraulic fluid 12 into rotational power. The hydraulic fluid 12 within the hydraulic motor 28 then bleeds off through the sixth fluid flow path 42 and into the sump 20 after the power has been extracted from the hydraulic fluid 12. The rotational power extracted from the hydraulic fluid 12 via the hydraulic motor 28 is then transferred to the hydraulic pump 30. The hydraulic pump 30 draws hydraulic fluid 12 up from the sump 20 via the eighth fluid flow path 46 and creates a low pressure, high flow of the hydraulic fluid 12 that exits the hydraulic pump 30 via the seventh fluid flow path 44. The low pressure, high flow hydraulic fluid 12 is then communicated to the hydraulic control system 14 to operate powertrain components.

The description of the invention is merely exemplary in nature and variations that do not depart from the gist of the invention are intended to be within the scope of the invention. Such variations are not to be regarded as a departure from the spirit and scope of the invention.

We claim the following:

1. A system in a motor vehicle, the system comprising:

an automatic transmission configured to control an output speed ratio of the motor vehicle;

a hydraulic control system having an engine driven pump and a plurality of clutches configured to control the automatic transmission;

a first control device having an open state and a closed state, the first control device in fluid communication with the hydraulic control system;

a hydraulic transformer having a first pump/motor unit connected with a second pump/motor unit, wherein the second pump/motor unit is in fluid communication with the first control device;

a second control device having an open state and a closed state, the second control device in fluid communication with the first pump/motor unit; and an accumulator for storing and releasing the hydraulic fluid, the accumulator in fluid communication with the second control device, wherein the accumulator is charged with pressurized hydraulic fluid when the first control device and the second control device are in the open state and the engine driven pump is operational and wherein the pressurized hydraulic fluid from the engine driven pump drives the second pump/motor unit, the second pump/motor unit drives the first pump/motor unit, and the first pump/motor unit delivers a flow of pressurized hydraulic fluid having a higher pressure and a lower flow than the pressurized hydraulic fluid from the engine driven pump to the accumulator, wherein the accumulator stores the pressurized hydraulic fluid when the second control device is in the closed state, and wherein the accumulator discharges the pressurized hydraulic fluid to the hydraulic transformer when the second control device is in the open state and when the engine driven pump is non-operational and wherein the pressurized hydraulic fluid from the accumulator drives the first pump/motor unit, the first pump/motor unit drives the second pump/motor unit, and the second pump/motor unit delivers a flow of pressurized hydraulic fluid having a lower pressure and a higher flow than the pressurized hydraulic fluid from the accumulator to the plurality of clutches in the hydraulic control system.

2. The system of claim 1 wherein the first control device includes an on/off solenoid or a variable force solenoid.

3. The system of claim 1 wherein the pressurized hydraulic fluid from the accumulator exhausts from the first pump/motor unit to a sump, and wherein the second pump/motor unit receives hydraulic fluid from the sump.

4. The system of claim 1 wherein the second control includes an on/off solenoid or a variable force solenoid.

5. The system of claim 1 wherein the accumulator is connected directly to the second control device by a first fluid passage.

6. The system of claim 5 wherein the second pump/motor unit is connected directly to the hydraulic control system by a second fluid passage.

7. The system of claim 6 wherein the first pump/motor unit is connected directly to the second control device by a third fluid passage.

8. The system of claim 1 wherein the flow of pressurized hydraulic fluid having a lower pressure and a higher flow than the pressurized hydraulic fluid from the accumulator has a flow rate from approximately 5 to approximately 10 liters per minute and a pressure approximately 350 kPa.

9. The system of claim 1 wherein the flow of pressurized hydraulic fluid having a higher pressure and a lower flow than the pressurized hydraulic fluid from the engine driven pump has a flow rate of approximately 1 liter per minute and a pressure of approximately 2000 kPa.

10. A system in a motor vehicle, the system comprising:

an automatic transmission configured to control an output speed ratio of the motor vehicle;

a hydraulic control system having an engine driven pump and a plurality of clutches configured to control the automatic transmission;

a first control device having an open state and a closed state, the first control device in fluid communication with hydraulic control system;

a hydraulic transformer having a first pump/motor unit connected with a second pump/motor unit, wherein the second pump/motor unit is in fluid communication with the first control device;

a second control device having an open state and a closed state, the second control device in fluid communication with the first pump/motor unit; and an accumulator for storing and releasing the hydraulic fluid, the accumulator in fluid communication only with the second control device, wherein the accumulator is charged with pressurized hydraulic fluid when the first control device and the second control device are in the open state and the engine driven pump is operational and wherein the pressurized hydraulic fluid from the engine driven pump drives the second pump/motor unit, the second pump/motor unit drives the first pump/motor unit, and the first pump/motor unit delivers a flow of pressurized hydraulic fluid having a flow rate of approximately 1 liter per minute and a pressure of approximately 2000 kPa, wherein the accumulator stores the pressurized hydraulic fluid when the second control device is in the closed state, and wherein the accumulator discharges the pressurized hydraulic fluid to the hydraulic transformer when the second control device is in the open state and when the engine driven pump is non-operational and wherein the pressurized hydraulic fluid from the accumulator drives the first pump/motor unit, the first pump/motor unit drives the second pump/motor unit, and the second pump/motor unit delivers a flow of pressurized hydraulic fluid having a flow rate from approximately 5 to approximately 10 liters per minute and a pressure approximately 350 kPa.

11. The system of claim 10 wherein the first control device includes an on/off solenoid or a variable force solenoid.

12. The system of claim 10 wherein the pressurized hydraulic fluid from the accumulator exhausts from the first pump/motor unit to a sump, and wherein the second pump/motor unit receives hydraulic fluid from the sump.

13. The system of claim 10 wherein the second control includes an on/off solenoid or a variable force solenoid.

14. The system of claim 10 wherein the accumulator is connected directly to the second control device by a first fluid passage.

15. The system of claim 14 wherein the second pump/motor unit is connected directly to the hydraulic control system by a second fluid passage.

16. The system of claim 15 wherein the first pump/motor unit is connected directly to the second control device by a third fluid passage.

* * * * *